(12) United States Patent
Combs

(10) Patent No.: US 8,720,522 B2
(45) Date of Patent: May 13, 2014

(54) MOTORCYCLE TIRE/WHEEL CHANGING TOOL

(76) Inventor: Sam Combs, Anchorage, AK (US)

( * ) Notice: Subject to any disclaimer, the term of this patent is extended or adjusted under 35 U.S.C. 154(b) by 527 days.

(21) Appl. No.: 13/070,268

(22) Filed: Mar. 23, 2011

(65) Prior Publication Data

US 2012/0241392 A1  Sep. 27, 2012

(51) Int. Cl.
*B60C 25/00* (2006.01)

(52) U.S. Cl.
USPC ............... 157/1.1; 157/14; 157/19; 157/20; 157/21

(58) Field of Classification Search
USPC .................... 157/1.1, 14, 19, 20, 21
See application file for complete search history.

(56) References Cited

U.S. PATENT DOCUMENTS

| | | | | |
|---|---|---|---|---|
| 3,331,412 A | * | 7/1967 | Sornsen | 157/14 |
| 3,556,194 A | * | 1/1971 | Farrington et al. | 157/13 |
| 3,844,328 A | * | 10/1974 | Lund | 157/1.24 |

\* cited by examiner

*Primary Examiner* — Lee D Wilson
*Assistant Examiner* — Shantese McDonald
(74) *Attorney, Agent, or Firm* — Patton Boggs LLP

(57) ABSTRACT

A motorcycle wheel changing tool is presented that utilizes a rolling carriage that immobilizes the front or back wheel utilizing flat steel swing arms and a tension spring that holds the wheel in place with a knockout retaining rod through the wheel. The entire unit can be rolled and/or lifted in place to work in conjunction with a motorcycle stand. There is a folding handle that expands or contracts to accommodate different size tire/wheel widths and can pull the unit. The rolling wheels can be raised or lowered for different motorcycles depending on the height of the bike in relation to the wheel stand. Additionally, four large eye hooks can be raised or lowered to secure the wheel. Two threaded rods are utilized that secure both angle ends in place to secure the unit so that it is perpendicular to the wheel and keeps the unit from flexing.

9 Claims, 11 Drawing Sheets

MOTORCYCLE TIRE/WHEEL CHANGING TOOL

BACKGROUND

The concept of a tool holding either a front or back motorcycle wheel immobile while either installing or removing (hereafter simply changing) it is a new concept and doesn't appear to have been attempted in any of the prior art review that has been accomplished. In the observance of the act of changing wheels during a motorcycle race, the mechanic and/or two mechanics race out of the garage or pit area with a wheel and the related spacers to the motorcycle that has been raised either on a rear wheel bike stand or front wheel bike stand or both. Then one mechanic attempts to install the axle through the front forks or back swing arm while holding the spacers in place, while the second mechanic holds the wheel in place with his foot and/or hands which usually results in the failure to align the axle correctly, thereby causing multiple attempts and sometimes ultimate failure to install and/or damage to the wheel. In the home mechanics garage or the professional mechanics shop, the same event occurs, but without the time constraints of changing a wheel during a race. A tool that will allow for much shorter changing procedures both during a race and in a garage or shop situation is needed.

BRIEF SUMMARY

The Motorcycle Tire/Wheel Changing Tool includes a motorcycle wheel changing tool that engages and immobilizes the front or back wheel along with a front speedometer cable gear unit assembly, disc brake(s) (hereafter simply "wheel"), and spacers or back wheel spacers/disk brake/sprocket (hereafter simply "wheel") in place on a rolling carriage that can be rolled around a garage, shop, or racing paddock and then be placed at the front or back wheel (in conjunction with any front of back wheel motorcycle lifting stand that is either double or single sided) to allow easy installation of the entire tire/wheel/spacer assembly (hereafter simply "wheel") with a knockout rod (in place of the actual wheel axle).

It is the object of this disclosure to provide an easy means of holding a motorcycle wheel in place and immobile whether it be the front or back wheel in the process of changing the wheel.

It is a further object of this disclosure to provide ease of use for either the home or professional mechanic in the adjustment of this tool so that a motorcycle wheel can be installed in a timely manner and by one individual.

Additionally, a further object of this design is for the relative ease of construction of the tool. The Motorcycle Tire/Wheel Changing Tool can be disassembled to fit in a compact shipping or mailing container for subsequent assembly of the parts by the end user, whether that is a home mechanic or professional mechanic or a racing team.

Another object of the design is to have the entire Motorcycle Tire/Wheel Changing Tool have the ability to move as one unit. The handle steel swingarms fold down on the side of the knock-out axle steel swingarms and are held in place by a thumbscrew mechanism on one end that allows the steel swingarms to be held at a desired angle and at the other end by L-shaped brackets that are attached to the side angles to hold both sets of steel swingarms firmly in place. Additionally, there are PTO clips that can be inserted through designated holes in both sets of steel swingarms that keep the steel swingarms in place while moving the unit around the garage, shop, or paddock. These PTO clips are secured by a chain to the side steel angles so that they are attached to the rest of the Motorcycle Tire/Wheel Changing Tool. Additionally, there are spring clips attached to the PTO clips to secure the PTO clips to the side steel angles when the handle and knockout axle steel swingarms are raised and in use. Also, the two knockout axles (small for the front wheel and larger for the back wheel) are attached to the Motorcycle Tire/Wheel Changing Tool by means of metal straps with rubber surrounds that secure the knockout axles in place and allow them to be removed for use with the knockout axle swingarms.

The initial adjustment of the Motorcycle Tire/Wheel Changing Tool relates to the height of the center of the axle when it is placed on a particular motorcycle stand. An initial measurement of the centerline of the axle to the floor will give the dimension needed to set the tool up to allow the knockout axle rod to be placed in the wheel at the same height. When the tool and wheel are in place, then the actual axle can be inserted on one side of the front forks or rear swingarm and pushed through, ejecting the knockout axle rod while keeping the spacers in position. The tool allows for multiple adjustments to allow for the multitude of tire and wheel sizes that are used on different motorcycles.

One of the adjustments available is the variable height of the rolling wheels that can be moved up or down by turning the wheel assembly either counter clockwise to lower the tool or clockwise to raise the tool. The wheels then can be locked in place at that particular height with a wing nut and wave lock washer or allowed to swivel while moving the Motorcycle Tire/Wheel Changing Tool around. Another adjustment is to push together or pull apart the right and left steel angle frame of the tool that adjusts to the wheel width and immobilizes the wheel. There is a scale with ½" increments along the inner edges of the end steel angles that allow for coordination of widths of both ends of the Motorcycle Tire/Wheel Changing Tool. Additionally, there are thumb screws and lock washers that lock the left and right and front and back steel angles in place. An additional adjustment is in relation to the eye hooks that lower clockwise and raise counter clockwise to further adjust the motorcycle wheels at the correct height for the axles. Another adjustment is the knockout steel axle arms that can be raised or lowered on an axis that allows for the different size of wheels and tires. These arms have multiple holes that allow the insertion of the knockout axle at several different heights. These arms are locked in place by thumb screws and lock washers to immobilize the arms and/or handle. Additionally, there is a spring provided that is stored by stretching it across either the left or right side eye hooks. Then when the spring is needed, it holds the two knockout steel axle rod swingarms in place, thereby immobilizing the spacers in place as well.

The entire assembly can be prepped prior to a race for easy installation of the wheel during a race. The utilization of two of these tools can be utilized for both the front and back wheels per race bike. The same two tools can be set up for the home or professional mechanic per a particular motorcycle. Additionally, axle heights, tire widths, and wheel widths can be recorded per bike with a particular bike stand that allows easy installation of the front or back wheels in a timely manner. An additional advantage is that the Motorcycle Tire/Wheel Changing Tool can be used by one individual rather than the need for at least two to change a wheel.

In one embodiment, an apparatus for changing a motorcycle wheel includes a carriage including four angles providing support for a motorcycle wheel, the carriage configured to allow expansion and contraction of the base to fit with different sized wheels and tires to be installed on either the front fork or back swingarm of a motorcycle while the motorcycle is supported by a motorcycle lift stand at one end of the motorcycle or both. In one alternative, the apparatus includes a first and second flat swingarm supported by two of the four angles at the right and left sides, the first and second flat swingarm having an outer position and configured to serve a handle, the first and second flat swingarm engaged with the two of the four angles at the right and left sides at a rotating joint allowing the first and second flat swingarms to be rotated 180 degrees, the first and second flat swingarms including slots that allow the handle to be compressed or expanded without any adjustment to the handle, the swingarm handle including thumbscrews for locking the swingarm handle in place. Optionally, the two of the four angles at the right and left sides support third and fourth flat swingarms, the third and fourth flat swingarms attached using a pivot configured to allow the swingarms to be pivoted 180 degrees and hold knockout axle rods that fit through knockout axle rod holes through the third and fourth flat swingarms. The third and fourth flat swingarms are held by a tension spring that is tensioned from the third flat swingarm to the fourth flat swingarm. Alternatively, the third and fourth flat swingarms are configured to be locked in place using thumbscrews. In another alternative, the first, second, third, and fourth swingarms fold down to a parallel position with the four angles. Optionally, the two of the four angles at the right and left sides support four eye-hooks configured to be raised and lowered by turning the eye-hooks clockwise or counter clockwise using sockets, and each eye-hook is secured using a wing nut and wave lock washer. Alternatively, the two side angles support four caged sets of two rollers each that can be raised and lowered using sockets and then locked using wing nuts and wave lock washers at the upper side of the angle. In one alternative, the apparatus further includes PTO clips supported by the two side angles inserted through holes in the two side angles and through the first and second swingarms to secure the swingarms in place, the PTO clips tethered to the two steel side angles using a chain, the PTO clips having a spring clip allowing them to attach to the two side angles when the two sets of swingarms are in use so that they do not interfere with the use of the apparatus. In another alternative, the apparatus further includes metal straps interconnected with the two different length knockout axle rods secured to the metal straps. In one alternative, the apparatus further includes cutout grating supporting the wheel and assisting in setting the wheel when in place in preparation to be changed and protecting threaded rods that span the longitudinal length of the tool.

In another embodiment, an apparatus for changing a wheel of a motorcycle includes a base; a first and second arm extending from the base, the first and second arm pivotally mounted on the base; a knockout axle inserted through an axle aperture in the wheel, the knockout axle inserted through a first and second aperture in the first and second arms respectively, such that the first and second arms are on either side of the wheel and the wheel is suspended in the air at a height proper for mounting the wheel on the motorcycle; and a retaining spring oriented between the first and second arm, engaging the wheel such that the wheel is held in place. Optionally, the first and second apertures are apertures of a plurality of apertures oriented in the first and second arms, such that the location of the knockout axle is adjustable. Alternatively, the apparatus further includes a replacement axle, the replacement axle sized to fit through the first and second apertures and push the knockout axle out of the first and second apertures when the motorcycle is positioned to receive the wheel and the replacement axle, therefore mounting the wheel.

BRIEF DESCRIPTION OF THE DRAWINGS

The foregoing objects, advantages, and features, as well as other objects and advantages, will become more apparent with reference to the description and drawings below, in which like numerals represent like elements and in which.

DETAILED DESCRIPTION

Figure 1:
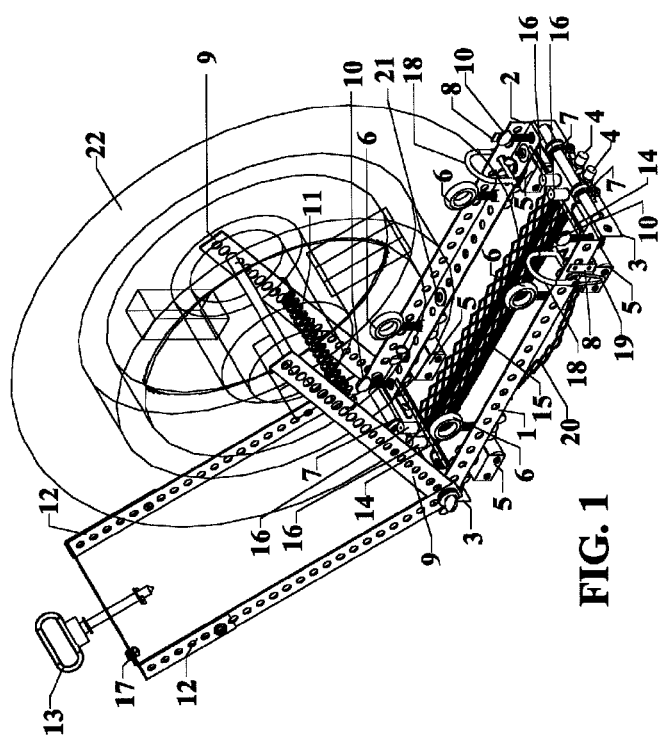
FIG. 1 is a perspective view of one embodiment of a Motorcycle Tire/Wheel Changing Tool shown from the front right corner showing a motorcycle wheel in place ready for changing.

Certain terminology is used herein for convenience only and is not to be taken as a limitation on the embodiments of a Motorcycle Tire/Wheel Changing Tool. In the drawings, the same reference letters are employed for designating the same elements throughout the several figures.

The words "right", "left", "front", and "back" designate directions in the drawings to which reference is made. The words "inwardly" and "outwardly" refer to directions toward and away from, respectively, the geometric center of the motorcycle tire/wheel changing tool and designated parts thereof. The terminology includes the words above specifically mentioned, derivatives thereof, and words of similar import.

Like reference numerals designate like or corresponding parts throughout the various views and with particular reference to each of FIGS. 1-11 as delineated below.

Figure 2:
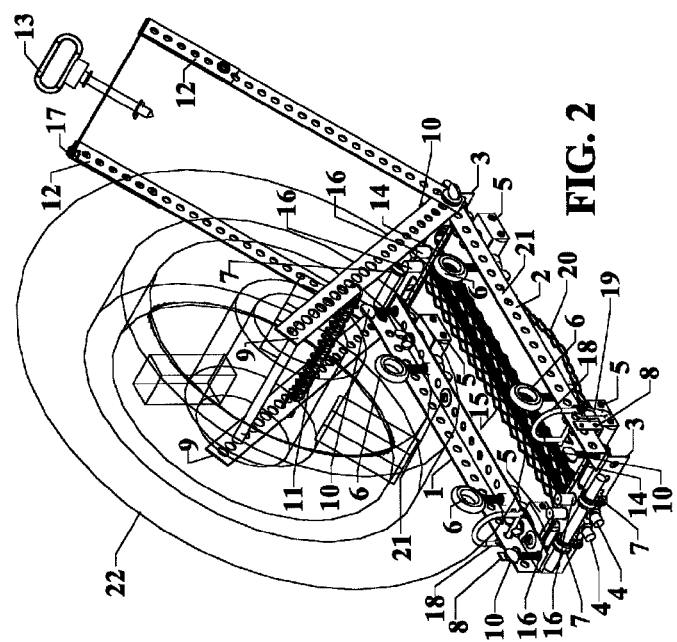
FIG. 2 is a perspective view of the Motorcycle Tire/Wheel Changing Tool of FIG. 1 shown from the front left corner showing a motorcycle wheel in place ready for changing.
Figure 3:
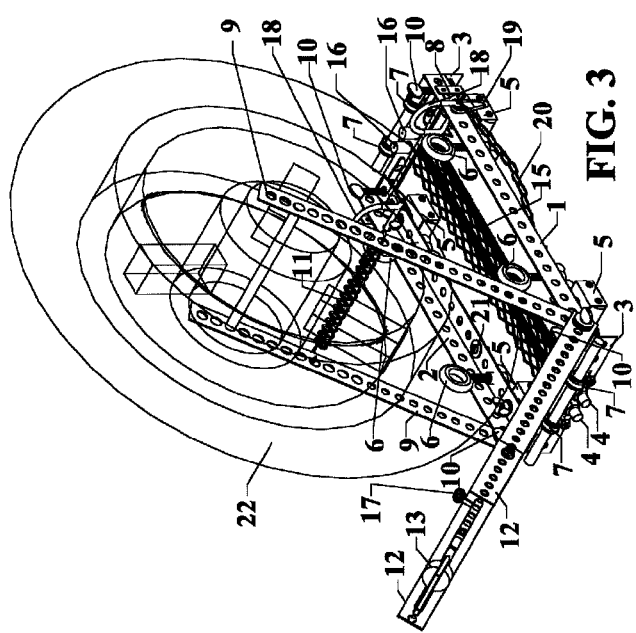
FIG. 3 is a perspective view of the Motorcycle Tire/Wheel Changing Tool of FIG. 1 shown from the back right corner showing a motorcycle wheel in place ready for changing.
Figure 4:
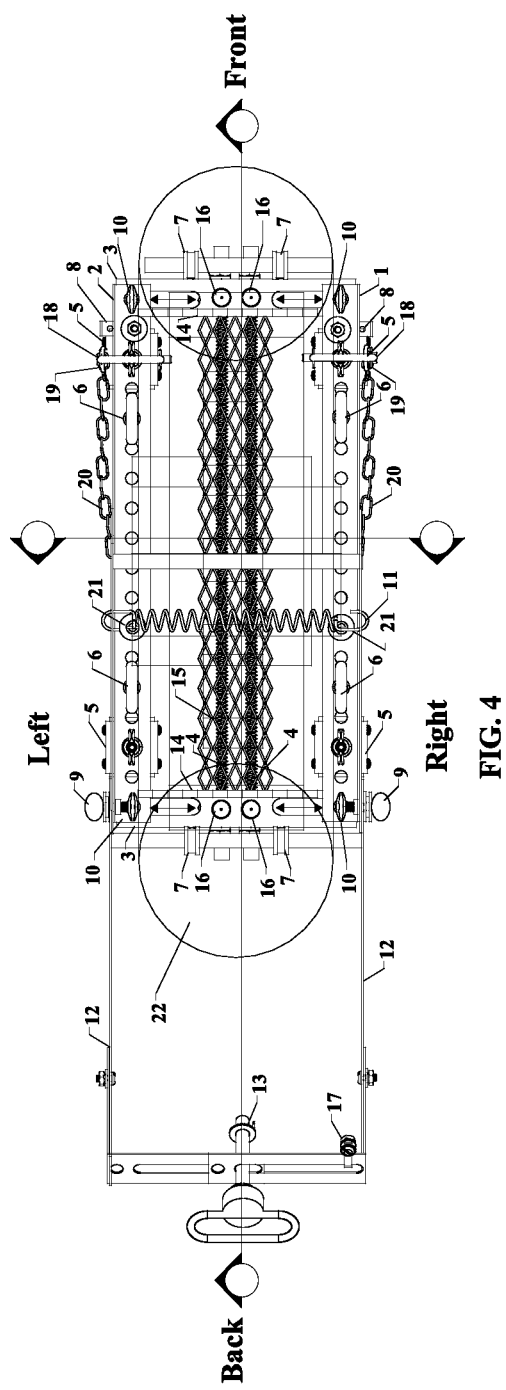
FIG. 4 is a plan view of the Motorcycle Tire/Wheel Changing Tool of FIG. 1 shown from above showing a motorcycle wheel in place ready for changing, the arrows designating the horizontal range of adjustment.
Figure 5:
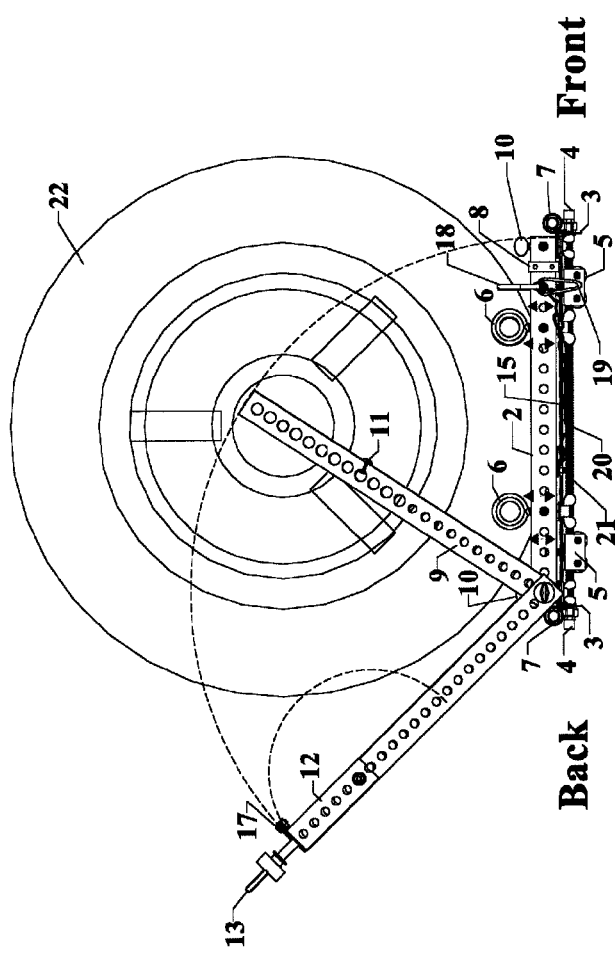
FIG. 5 is a right elevation side view of the Motorcycle Tire/Wheel Changing Tool of FIG. 1 showing a motorcycle wheel in place ready for changing and the arc of the handle and knockout axle rod swingarms, the arrows designating the horizontal range of adjustment.
Figure 6:
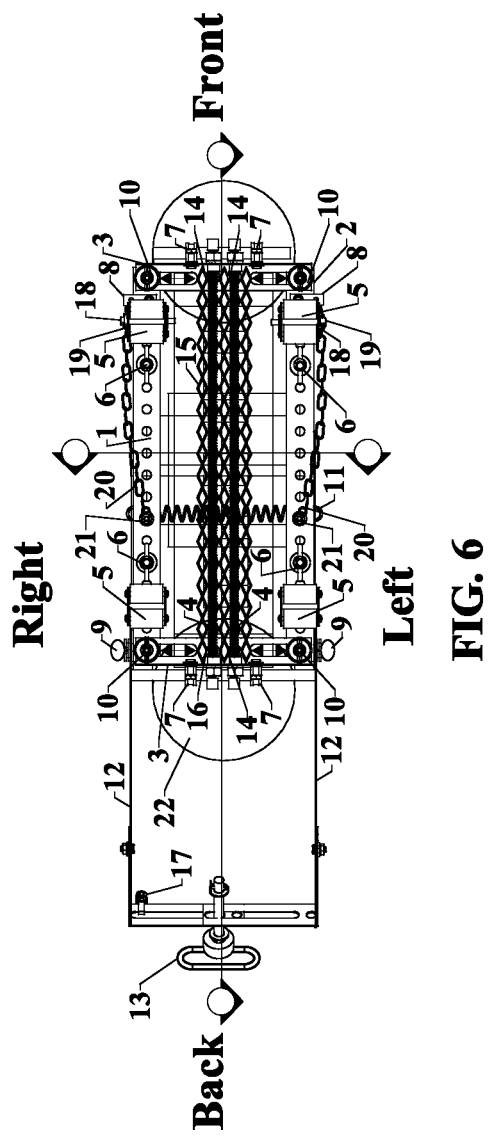
FIG. 6 is a plan view of the Motorcycle Tire/Wheel Changing Tool of FIG. 1 shown from below showing a motorcycle wheel in place ready for changing, the arrows designating the horizontal range of adjustment.
Figure 7:
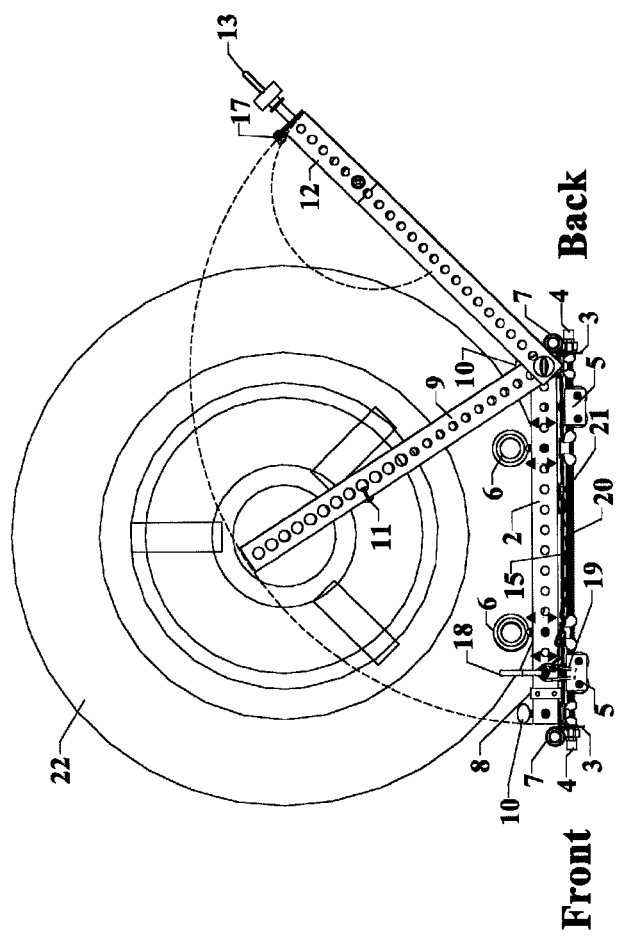
FIG. 7 is a left elevation side view of the Motorcycle Tire/Wheel Changing Tool of FIG. 1 showing a motorcycle wheel in place ready for changing and the arc of the handle and knockout axle rod swingarms, the arrows designating the horizontal range of adjustment.
Figure 8:
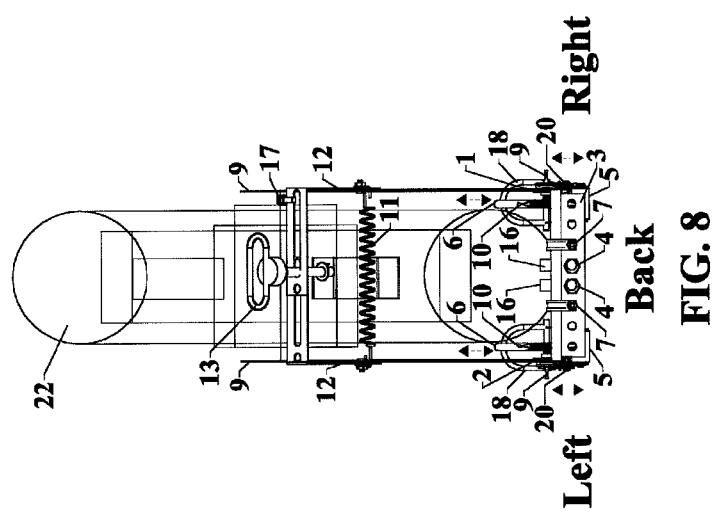
FIG. 8 is a back elevation view of the Motorcycle Tire/Wheel Changing Tool of FIG. 1 showing a motorcycle wheel in place ready for changing, the arrows designating the horizontal range of adjustment.
Figure 9:
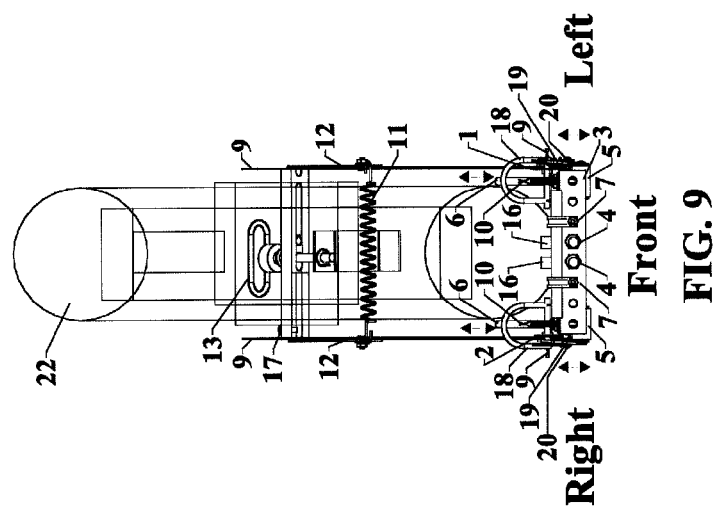
FIG. 9 is a front elevation view of the Motorcycle Tire/Wheel Changing Tool of FIG. 1 showing a motorcycle wheel in place ready for changing, the arrows designating the horizontal range of adjustment.
Figure 10:
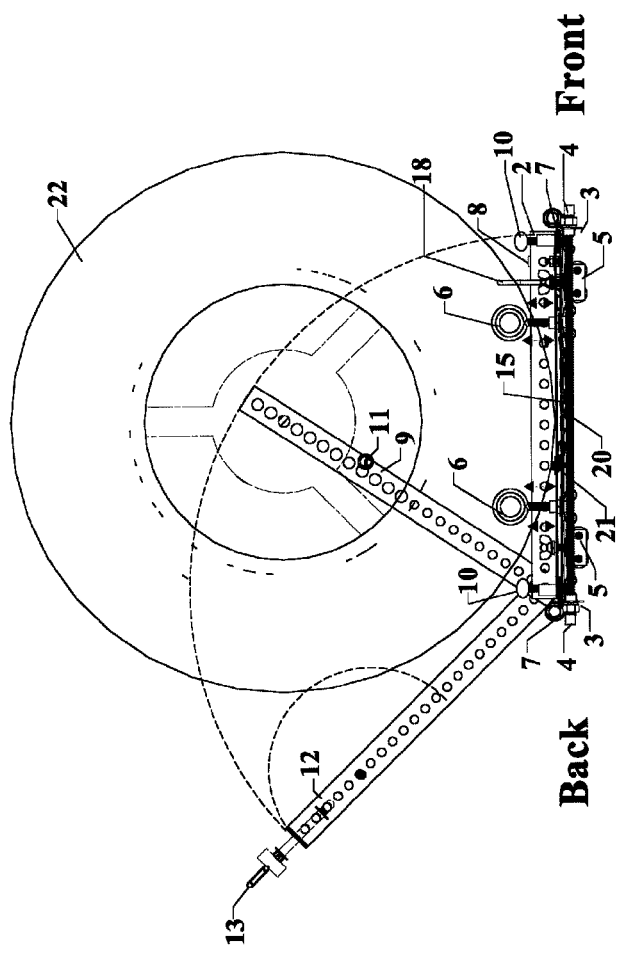
FIG. 10 is a longitudinal section as identified on FIG. 3 showing a motorcycle wheel in place ready for changing.
Figure 11:
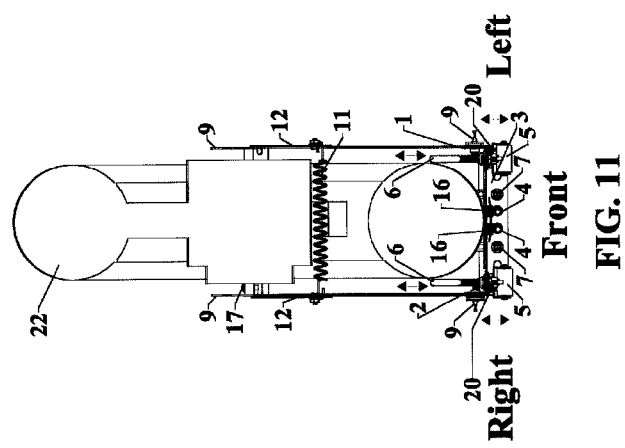
FIG. 11 is a transverse section as identified on FIG. 3 showing a motorcycle wheel in place ready for changing.

FIGS. 1-3 show one embodiment of a Motorcycle Tire/Wheel Changing Tool and delineate perspective views from several angles that show the two main steel angles 1 and 2 running longitudinally and the two identical end steel angles 3 running at 90 degrees to the main steel angles. Steel angles 1 and 2 are not interchangeable, since there is a pivot at the back end that allows the two sets of steel swingarms 9 and 12 to pivot on that point. The end steel angles 3 are interchangeable. The side steel angles 1 and 2 have one flat side horizontal and the other side vertical at the perimeter of the Motorcycle Tire/Wheel Changing Tool. The vertical portion of the steel side angles 1 and 2 hold the pivots for the two steel swing arms 9 and 12, as well as a place to insert the PTO clips that secure the steel swingarms 9 and 12 while transporting the tool or when the steel swingarms 9 and 12 are raised and in use to install a wheel. The horizontal portion of the steel side angles provides for the thumb screws located at the four corners of the tool that allow the steel side 1 and 2 angles and the end 3 steel angles to be locked in place to secure the wheel in place, hold the carriage wheels 5 to allow the motorcycle wheels to be raised or lowered in the tool to allow for different sizes of motorcycle wheels, hold the eye bolts 6 to be raised or lowered to adjust for the different wheel sizes, the steel angles 8 at one end of the tool that hold the steel swingarms 9 and 12 in place and in line with the steel side angles 1 and 2, and the chain 20 to be held at one end of the chain by the nuts and bolts 21 to secure the chain to the tool undercarriage.

The steel end angles 3 hold the threaded steel rods in place that ensures the tool is square. The threaded rods 4 are installed through threaded, imbedded, and compressed (hereafter TICS) aluminum sockets. The threaded rods 4 are covered with four rubber end pieces to ensure that the threads are not damaged and that they do no damage to the motorcycle. The horizontal portion of the steel end angles 3 are positioned under the two steel side angles 1 and 2, and the vertical portion of the steel end angles 3 are the portion where the threaded rods 4 are threaded through the TICS and are secured with nuts and lock washers. The vertical portions of the steel end angles 3 hold metal straps with a rubber covering 7 that secure the two knockout axle rod sizes at each end of the Motorcycle Tire/Wheel Changing Tool.

The steel side angles 1 and 2 hold the long thumb screws 10 that secure the steel side angles 1 and 2 in place. The long thumb screws 10 are threaded through TICS and locked in place under the end angles 3 with wing nuts and lock washers. The TICS extend though the steel side angles 1 and 2 and the end angles 3 to act as guides to allow the steel side angles 1 and 2 to slide over the steel end angles 3 to expand and contract the tool. Washers are placed under the steel end angles 3 that secure the TICS from jumping out of the slots that run from each side of the steel end angles 3 towards the center of the steel end angles 3. The second washer at each location provides a surface for the lock washer to rest and be secured by the wing nut. Additionally, there is a smooth surface at the horizontal portion on the inner and upper side of the end angles 3 that has ½" increments to allow the accurate movement and securement of the steel side angles 1 and 2 to the end angles 3. On the under side of the horizontal portion, the surface is knurled to provide friction that will secure all the steel angles 1, 2, and 3 in place while installing the motorcycle wheel.

Spanning between the steel end angles 3 is a slightly curved expanded steel grating 15 with diamond-shaped openings that are secured by the steel end angles 3 with bolts, nuts, washers, and lock washers 16, as well as rubber covers over the ends of the bolts to protect the tire from damage. The expanded steel grating 15 holds the wheel in place and additionally protects the threaded rods 4 below it and provides additional stability to a Motorcycle Tire/Wheel Changing Tool.

The flat steel swingarms 12 that are placed outside the knockout axle rod flat steel swingarms 9 act as the fold away handle and utilize a rubber coated end handle 13 that slides inside slots that are in the end flat steel L-shaped that is bent at right angles to the flat steel swingarms 12 portion that is secured by the short thumb screws at the back end of the side steel angles 1 and 2. This allows the end handle 13 to slide when the tool either expands or contracts to allow for different size wheel widths. Additionally, there is a small C-shaped clip 17 that allows the handle portions of the flat steel swingarms to slide together in line to keep the handle 13 at a right angle to the end flat steel 12. Note that the flat end steel 12 will also bend back towards the center of the tool, allowing the end handle 13 to be more compact and rest between the two steel side angles 1 and 2.

When fully expanded, the steel side angles 1 and 2 are approximately 8" from the outside of the vertical portion of the angles. When fully compressed towards the center of the tool, the side angles are approximately 4.75" from the outside of the vertical position of the angles. The variability of the width of the Motorcycle Tire/Wheel Changing Tool allows the installation of wider back wheels and narrower front wheels by the same tool. The total length of the Motorcycle Tire/Wheel Changing Tool is less than 21" from the outside of the threaded rods 4 and less than 18.5" from the outside of the steel end angles 3 to create a compact motorcycle wheel changing tool.

The four large eye hooks 6 that are placed within and on top of the horizontal portion of the two steel side angles 1 and 2 are able to be moved up or down through the TICS that secures them to the side angles 1 and 2. Large wing-nuts, washers, and wave lock nuts below the horizontal portion of the side angles 1 and 2 allow the large eye hooks 6 to be locked in place at the desired and required height to install the axle in the front or back wheel.

The two flat steel swingarm combinations 9 and 12 rest flat along side the steel side angles 1 and 2 and are held in place by a thumb screw with TICS that is secured by two washers and a wave lock washer between them on each side of the tool. This allows the two flat steel swingarm combinations 9 and 12 to swing through an arc of +180 degrees. At the other end of the tool, the two flat steel swingarm combinations 9 and 12 rest on angles 8 that are secured with bolts, nuts, washers, and lock washers to the steel side angles 1 and 2.

The inner flat steel swingarms 9 swing through the arc to align one of the twelve holes on either side with the wheel axle hole and to allow the knockout axle rod to be placed through the steel swing arm 9 holes through the wheel. After the insertion of the knockout axle rod through both sides of the steel swingarms 9 holes and the wheel, a spring 11 is attached to both of the steel swingarms through one hole on each side of the tool to secure the wheel in place on the tool to enable wheel installation. When the spring 11 is not in use, it will be stored stretching between two of the eye hooks 6 that are on one side or the other of the tool.

The PTO clips 18 that can be utilized at the opposite end of the swing arms 9 and 12 are placed through the third holes from the front end of the tool through the steel swingarms 9 and 12, as well as steel side angles 1 and 2. This aligns the PTO clips 18 through the open center of the wing nuts that secure the front Motorcycle Tire/Wheel Changing Tool wheels 5 in place when the tool is transported. Additionally, when the steel swingarms 9 are released to secure the wheel 22 in place, the PTO clips are removed, but stay with the tool by means of chains that are held at one end by a bolt and nut combination 21 and can be hooked to the steel side angles 1 and 2 by means of spring clips 19 through one of the holes in the steel side angles 1 and 2. Thus, all parts of the tool are attached to and with the Motorcycle Tire/Wheel Changing Tool at all times, avoiding the loss of parts.

Exemplary listings of parts that may be used in the construction of the Motorcycle Tire/Wheel Changing Tool are listed below:

1. 1.25"×1.25" 12 Gauge Steel Angle—Right Side with 0.375"ø Holes @ 1" On Center;
2. 1.25"×1.25" 12 Gauge Steel Angle—Left Side with 0.375"ø Holes @ 1" On Center;
3. 1.25"×1.25" 12 Gauge Steel Angle With 0.375"ø Holes @ 1" On Center 2 2.5" Long×0.5625" Wide Slot With Rounded Ends @ Each End—Front and Back;
4. 0.375"ø×22.5" Long Threaded Rod With 0.375"ø I.D. Aluminum Threaded, Imbedded, and Compressed Socket, 0.375"ø Regular Lock Washer, 0.375" Nut and, 0.375" Rubber End Cover;
5. 0.875"ø×1.5" Long Nylon Roller Wheels With Rivets, 0.3125"ø×1" Long Threaded Post, 0.3125"ø I.D. Aluminum Threaded, Imbedded, and Compressed Socket, 0.375"ø I.D./0.875"ø O.D. Washer, 0.375"ø I.D./0.625"ø O.D. Wave Washer, and 0.3125"ø Wing Nut;
6. 0.375"ø×4" With 2" Threaded Eye Hook With 0.375"ø I.D. Threaded, Imbedded, and Compressed Socket, 0.4375"ø I.D./0.875"ø O.D. Wave Locknut, 0.4375"ø I.D./⅞"ø O.D. Washer and 0.375 Wingnut;
7. #10×0.75" Long Panhead Bolt With Locknut, 0.25" Steel Spacer and x"ø Aluminum C Clamp With Rubber Encasement To Hold 0.5"ø×6.5" Long Front Axle Rod At One End and 0.5"×8.5" Long Back Axle Rod Knockout At One End;
8. 1.5"×1.5"×0.5" Wide Angle With 2.125"ø Holes Per Angle Side With #10×0.5" Long Panhead Bolts With 0.1875"ø I.D./1"ø O.D. Washer, and 0.1875"ø I.D. Lock Washer and Nut;
9. 18" Long×1.125" Wide 12 Gauge Flat Steel With 11.125"ø Holes and 12×0.5625"ø Holes with 1" Long× 0.3125"ø Thumb Screw With 0.3125"ø Aluminum Threaded, Embedded, and Compressed Sockets With 0.125"ø I.D./2.825"ø O.D. Washers, and 0.3125"ø I.D. Regular Lock Washer;
10. 0.3125"ø×2.5" Long Thumb Screw With 0.3125"ø Aluminum Threaded, Embedded, Compressed Insert With Longer Compression Extended Into Slot With 0.5625"ø I.D./1.025"ø O.D. Retaining Washer, 0.125"ø I.D./0.825"ø O.D. Washer and 0.375"ø I.D./0.625"ø O.D. Wave Lock Washer and 0.3125"ø Wing Nut;
11. 0.75"ø×8.5" Extended and 3.5" Un-extended Length Retaining Spring;
12. 1.125"×18" 12 Gauge Flat Steel With 0.275"ø Holes @ 1" O.C. With #10×0.375" Long Bolt With 0.625"ø O.D. Washer, Lock Washer, and Bolt To 1.125"×5"×5.5" 12 Gauge Angle With x0.5625" Wide×4.25" Long Slot For ½"ø×6.25" Long×3.75" Wide Hitch Pin Rubber Coated Handle With x0.5625"ø I.D.×2 1.125" O.D./1.125"ø O.D. Heavy Duty Washers With Heavy Duty Cotter Pin;
13. #10×0.125" Long Bolt With 0.625"ø O.D. Washer, Lock Washer, and Bolt;
14. 6" Scale With 0.5" Divisions To Allow Accurate Adjustment Of Tool To Hold Tire/Wheel;
15. 2.5"×18"×0.25" Curve Expanded Steel Grating With Diamond 0.5" Openings;
16. #8×1" With 4.625" O.D. Washers, 2.125" O.D. Washer, Nut, and Lock Washer;
17. 0.25" Wide×1" Long C-Shaped Clip With #8×,5" Bolt With 2.125" Washers, Bolt, and Locknut;
18. PTO Pin—2"×2";
19. 0.25" Spring Link;
20. ¹⁄₁₆"×0.125"×0.625"×6" Chain Link;
21. #8×0.75" Bolt With 0.15625"×0.875" Washer With, 0.25" Rubber Grommet and Lock Washer With 0.125" O.D. Washer; and
22. Motorcycle Tire/Wheel—Not Part Of Tool.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein, but is intended to cover modifications within the spirit and scope thereof as defined by the appended claims and any and all equivalents thereof.

What is claimed as new and desired to be protected by Letters Patent of the United States is:

1. An apparatus for changing a motorcycle wheel comprising:
   a carriage including four angles, a first angle and a second angle of the four angles running longitudinally and approximately parallel to each other to provide a right side and a left side of the carriage, a third angle and a fourth angle of the four angles connecting the first and second angles to form the carriage, providing support for a motorcycle wheel, the carriage configured to allow expansion and contraction of the base to fit with different sized wheels and tires to be installed on either the front fork or back swingarm of a motorcycle while the motorcycle is supported by a motorcycle lift stand at one or both ends of the motorcycle;
   a first flat swingarm and a second flat swingarm supported by two of the four angles at the right and left sides, the first and second flat swingarms having an outer position and configured to serve a handle, the first and second flat swingarms engaged with the two of the four angles at the right and left sides at a rotating joint allowing the first and second flat swingarms to be rotated 180 degrees, the swingarm handle including thumbscrews for locking the swingarm handle in place;
   wherein the two of the four angles at the right and left sides support a third flat swingarm and a fourth flat swingarm, the third and fourth flat swingarms attached using a pivot configured to allow the swingarms to be pivoted 180 degrees and hold knockout axle rods that fit through knockout axle rod holes through the third and fourth flat swingarms, and
   the third flat swingarm and the fourth flat swingarm are held by a tension spring that is tensioned from the third flat swingarm to the fourth flat swingarm.

2. The apparatus of claim 1 wherein the third and fourth flat swingarms are configured to be locked in place using thumbscrews.

3. The apparatus of claim 2 wherein the first, second, third, and fourth flat swingarms fold down to a parallel position with the four angles.

4. The apparatus of claim 3 wherein the two of the four angles at the right and left sides support four eye-hooks configured to be raised and lowered by turning the eye-hooks clockwise or counterclockwise using sockets; and each eye-hook is secured using a wing nut and wave lock washer.

5. The apparatus of claim 4 wherein the first and second angles support four caged sets of two rollers each that can be raised and lowered using sockets and then locked using wing nuts and wave lock washers at the upper side of the angle.

6. The apparatus of claim 5 further comprising:
PTO clips supported by the first and second angles inserted through holes in the two side angles and through the first and second flat swingarms to secure the swingarms in place, the PTO clips tethered to the two steel side angles using a chain, the PTO clips having a spring clip allowing them to attach to the two side angles when the two sets of swingarms are in use so that they do not interfere with the use of the apparatus.

7. An apparatus for changing a wheel of a motorcycle, the apparatus comprising:
a base;
a first arm and a second arm extending from the base, the first and second arms pivotally mounted on the base;
a knockout axle inserted through an axle aperture in the wheel, the knockout axle inserted through first and second apertures in the first and second arms respectively, such that the first and second arms are on either side of the wheel, and the wheel is suspended in the air at a height proper for mounting the wheel on the motorcycle; and
a retaining spring oriented between the first and second arms, engaging the wheel such that the wheel is held in place wherein the first and second apertures are apertures of a plurality of apertures oriented in the first and second arms, such that the location of the knockout axle is adjustable.

8. The apparatus of claim 7 further comprising a replacement axle, the replacement axle sized to fit through the first and second apertures and push the knockout axle out of the first and second apertures when the motorcycle is positioned to receive the wheel and the replacement axle, therefore mounting the wheel.

9. An apparatus for changing a wheel of a motorcycle, the apparatus comprising:
a base;
a first arm and a second arm extending from the base, the first and second arms pivotally mounted on the base;
a knockout axle inserted through an axle aperture in the wheel, the knockout axle inserted through first and second apertures in the first and second arms respectively, such that the first and second arms are on either side of the wheel, and the wheel is suspended in the air at a height proper for mounting the wheel on the motorcycle;
a retaining spring oriented between the first and second arms, engaging the wheel such that the wheel is held in place; and
a replacement axle, the replacement axle sized to fit through the first and second apertures and push the knockout axle out of the first and second apertures when the motorcycle is positioned to receive the wheel and the replacement axle, therefore mounting the wheel.

* * * * *